United States Patent [19]

Crofts et al.

[11] Patent Number: 5,215,665
[45] Date of Patent: Jun. 1, 1993

[54] PURIFICATION OF HYDROGEN PEROXIDE

[75] Inventors: Rhona D. Crofts, Hillyland, Scotland; John Williams, St. Helens, England

[73] Assignee: Interox Chemicals Limited, London, England

[21] Appl. No.: 807,824

[22] PCT Filed: Jul. 18, 1990

[86] PCT No.: PCT/GB90/01102

§ 371 Date: Jan. 23, 1992

§ 102(e) Date: Jan. 23, 1992

[87] PCT Pub. No.: WO91/01267

PCT Pub. Date: Feb. 7, 1991

[30] Foreign Application Priority Data

Jul. 25, 1989 [GB] United Kingdom ............... 8916934

[51] Int. Cl.⁵ ............................................. B01D 61/58
[52] U.S. Cl. ................................. 210/638; 210/639; 210/669; 210/687
[58] Field of Search ............... 210/638, 639, 641, 669, 210/681, 687; 423/273, 584

[56] References Cited

U.S. PATENT DOCUMENTS

| 3,387,938 | 6/1968 | Leaver | 423/584 |
| 3,944,485 | 3/1976 | Rembaum et al. | 210/638 |
| 4,132,762 | 1/1979 | Kim | 423/584 |
| 4,879,043 | 11/1989 | Boughton et al. | 210/651 |

FOREIGN PATENT DOCUMENTS

3826720A1 6/1989 Fed. Rep. of Germany.

*Primary Examiner*—Ivars Cintins
*Attorney, Agent, or Firm*—Larson and Taylor

[57] ABSTRACT

The electronics industry demands that hydrogen peroxide for use therein be purified to very low levels of impurities, currently at the level of a few ppb for some impurities, or even lower. However, existing methods are either inherently unsafe because they bring concentrated hydrogen peroxide into contact with a concentrate of transition metal decomposition agents for peroxide and a purification resin which acts as a source of carbon, or are unable to attain the desired impurity level. In the instant purification process, the hydrogen peroxide solution is passed through a membrane having a very small pore size which contains an ion exchange resin that is capable of removing alkali and alkaline earth metal ions from solution. The feed solution in characterized in that it contains no more than a small proportion by weight of transition metals that catalyse hydrogen peroxide decomposition compared with the total metals content. The feed solution in some embodiments results from a prior treatment of an iron or copper contaminated solution with a dispersion of stannic oxide.

19 Claims, No Drawings

PURIFICATION OF HYDROGEN PEROXIDE

The present invention relates to processes for the purification of hydrogen peroxide solutions and particularly to the production of solutions in which cationic metal concentrations have been reduced to very low levels.

Aqueous hydrogen peroxide solutions are currently made or have been proposed to be made by a variety of different techniques. These include electrolytic techniques often involving hydrolysis of persulphuric acid or a salt thereof, autoxidation techniques in which a carrier, typically an alkyl-substituted anthraquinone, is subjected cyclically to reduction with hydrogen, oxidation with air and extraction of hydrogen peroxide with water and more recently processes involving the direct oxidation of hydrogen with oxygen in the presence of certain catalysts and under selected conditions.

Many variations of the foregoing manufacturing techniques are known. After the aqueous hydrogen peroxide solutions have been formed, they can be concentrated and purified to some extent by water removal or distillation techniques. Although the hydrogen peroxide manufacturing techniques differ markedly in their operation, they share the common result that the aqueous hydrogen peroxide solution obtained, even after distillation, contains significant amounts of residual impurities, including in particular a number of metal ions.

Although there has always been a desire to obtain aqueous hydrogen peroxide solutions of high purity, a qualitative term, the use of hydrogen peroxide in the semiconductor and allied electronics industries has imposed new and increasingly stringent, quantitative standards on the term in recent years. This is because such industries have demanded since their inception lower levels of residual impurities that could remain in peroxide solutions than were tolerable for other purposes, but also because their purity specifications have become increasingly tight, especially noticeably during the period of 1985 to date. It is convenient to call hydrogen peroxide solutions which meet 1988/9 impurity standards as ultra-pure so as to distinguish them from the state of the art products of former eras, which tolerated much higher impurity levels.

It is recognised that various techniques have already been proposed or used for the purification of hydrogen peroxide solutions and these include distillation and related water-removal techniques. These can be especially useful for the removal of organic impurities, such as compounds employed in autoxidation manufacturing methods, but are of lesser value for removing inorganic ions like metals or acidic anions in that they tend to remain to a greater or lesser extent in the aqueous hydrogen peroxide rather than being carried out in the distillate water.

There have also been a number of processes proposed for purifying hydrogen peroxide solutions in which the particularly aggressive transition metal ions have been replaced by more benign ions such as alkali metals. Although such techniques may produce a product that is acceptable for some purposes, they are not acceptable in the electronics field because acceptable levels of such metals too are strictly limited in their product specifications. Thus, the processes of U.S. Pat. No. 2,027,839 assigned to Du Pont or GB 409 361 in the name of Roessler & Hasslacher Chemical Company are not suitable for the instant purpose by virtue of their introduction of substitute metal ions or counterions that are not removed.

In recent times, a purification technique has been proposed in Japanese Kokai 62-187103 (1987) to Wako Junaku KK in which an impure aqueous hydrogen peroxide solution is that are preferably in hydrogen form. Such a process can be effective, but suffers from relatively indiscriminate exchange of metals, with the result that the resin rapidly becomes loaded with transition metal ions that cause decomposition of hydrogen peroxide. This type of reaction is not only highly exothermic but also temperature dependent, so that there is a very real risk that once a decomposition begins, it will rapidly accelerate out of control, resulting in an explosion. The present inventors are aware of a number of similar such occurances and accordingly are obliged to discount the general use of such resins for hydrogen peroxide purification.

It is an object of the present invention to identify a process and apparatus in which an extremely pure grade of hydrogen peroxide can be produced, without significantly promoting explosive decomposition of the hydrogen peroxide but in which the concentration of metal ions is reduced to a very low level.

It is a further object of the invention in at least one aspect to provide a means of producing pure hydrogen peroxide that is simple and easy to operate without costly training.

According to the present invention, there is provided a process for the purification of an impure aqueous hydrogen peroxide solution in which the impure solution is brought into contact with an ion exchange resin characterised in that the solution contains a substantial excess of non-transition metal cations relative to transition metal cations and is passed through a membrane containing a particulate cation exchange resin in essentially hydrogen form.

By carrying out the process according to the instant invention, it is possible to produce a hydrogen peroxide solution that has a substantially lower total content of metal ion impurities, including alkali metal and alkaline earth metal ions without exposing the process operator to undue risks from in situ hydrogen peroxide decomposition. It will be recognised that the benefit of improved safety arises from the deliberate restriction of the hydrogen peroxide starting material to those solutions in which the residual proportion of catalytic impurities is only a small fraction of the total content of metal ions including alkali and alkaline earth metal ions and Group III non-transition metal ions. This enables the resin impregnated in the membrane to take-up mainly those ions which do not decompose peroxide to any significant extent.

It is recognised that hydrogen peroxide source material commercially available can vary in its content of metallic impurities, and in the proportion that transition metals comprise. Standard grades of hydrogen peroxide, i.e. those not intended for the electronics industry have too high a catalytic metals content, in our experience. Consequently, the hydrogen peroxide solution employed in the present invention process has normally already been subjected to a purifying process in which a significant reduction in transition metal concentrations has occurred. One type of prior purifying process which is particularly convenient to employ in conjunction with the present process is the subject of co-pending British patent application no. 8908210.1 to the present applicant company. That process comprises the introduction of a dispersion of a particulate stannic oxide into the peroxidic solution, contact being maintained for a suitable period of time to allow the stannic oxide to extract metal ions from solution and subsequently the separation of the dispersed solids from the solution. Such a prior purifying process is so suitable because it is especially effective for transition metal ions.

The present invention is particularly suitable for the purification of hydrogen peroxide solutions in which the transition metal ions provide no more than about 20% w/w of the total cation content. Without restricting to a maximum total concentration, the total cation concentration is usually not greater than about 300 ppb and in many instances is up to 150 ppb, the expression ppb herein indicating 1 part per 1000 million parts. Within the foregoing total cation content, transition metal cations normally constitute no more than about 20 ppb, preferably less than 10 ppb and the non-transition metal ions are often from about 50 to 150 ppb, in practice.

The purification process of the present invention can be employed in respect of any aqueous solution containing about 75% w/w hydrogen peroxide or less and in many instances it will have a concentration in the range of 1 to 75%, and especially 5 to 75% w/w. The process can therefore be employed for concentrated hydrogen peroxide such as those containing 25 to 75% w/w $H_2O_2$.

The invention process is preferably effected by passing the hydrogen peroxide solution through the membrane which is impregnated with a suitable ion exchange resin. In practice, the membrane is most preferably a sheet of material that is inert to hydrogen peroxide that contains very small pores, such a nominal diameter in the range of up to 1 micron, and often from 0.1 to 0.5 microns diameter. In some embodiments the membrane is chosen in order to filter out small particles of at least about 0.1 microns diameter and particularly from 0.07 to 0.25 microns. In other embodiments, a membrane with a slightly larger nominal pore diameter is more convenient, suchas from 0.4 to 0.5 microns. It is preferable to select the material of construction of the membrane from those materials which do not release substantial quantities of ions into solution, such as polymeric fluorocarbons or fluorohydrocarbons, of which the most readily available example is PTFE. Alternative materials such as cellulose acetate may also be contemplated.

It will be recognised by employing such a material for the membrane, it is possible for the peroxide solution which is treated by the invention process to still contain an amount of dispersed solids, such as stannic oxide and thereby combining into a single step the final filtration step of the process according to GBPA 8908210.1 with the thereby combining into a single step the final filtration step of the process according to the SOPP Application with the cation-removing process step of the instant invention. For the avoidance of doubt, the disclosure in SOPP Application is incorporated herein by reference. The stannic oxide dispersion in the pre-treatment step can be obtained by subjecting a particulate suspension of stannic oxide in an aqueous fluid to high shear forces. The combination of a stannic oxide treatment and a membrane-containing resin treatment is particularly useful and convenient because it enables the peroxide solution during transportation and storage to contain a small but effective amount of stannic oxide that can eliminate or at least ameliorate the potentially harmful effects of contamination of the peroxide solution that can occur after the solution had been initially purified to low transition metal levels.

The resin which is incorporated in the membrane can be any ion exchange resin in particulate form that is capable of removing metals ions from solution, but of it will be recognised that the resin will be itself an electronic grade material, i.e. itself been made or treated so as to not release any significant quantity of contaminants into the peroxide solution. The resin is most conveniently a polystyrenedivinyl benzene resin containing a suitable acidic substituent and preferably a strong acid such as a sulphonic acid to effect the cation exchange, because the combination of such a resin and membrane is readily available. The acidic substituent of the resin could, of course, be replaced or augmented by other suitable cation exchange substituents and the resin structure by other suitable cross-linked structures.

It will be recognised that the membrane carries out, potentially, two functions. First, it acts as a filter preventing foreign particles contaminating the treated peroxide solution and secondly it prevents the resin particles from being retained in the peroxide solution. Thus, although in the most convenient way of effecting the present invention, the resin is actually impregnated within the body of a single membrane, the invention also contemplates a variation thereof in which the resin particles are physically disposed within an enveloping membrane or disposed in the space within a cartridge defined by two membranes and the impervious cartridge sidewall. The membranes can themselves be impregnated with the same resin or a different resin if desired.

The instant invention process is most preferably carried out just before the point of use of the hydrogen peroxide solution, for example in the outflow line from the peroxide storage or transportation vessel.

In some embodiments, the resin-containing membrane or membranes are fitted transversely across and snugly within the side walls of a cartridge, the inlet of which is preferably adapted to receive or fit into the outlet line from a storage or transport tank for impure hydrogen If desired, the peroxide solution can be passed through more than one resin-impregnated membrane, either in a plurality of passes, storing the once-treated peroxide solution in the interval between treatments or by disposing a plurality of resin membranes containing the same or a different resin in series in an appropriate housing in line and effecting the process in a single pass.

In theory, the resins could be regenerated after use by washing with a suitably strong acidic medium to exchange hydrogen for the metal ions in the resin, but this requires the use of extremely pure acid and adds a further processing step for the user. In practice, the invention can be effected most conveniently using a disposable cartridge, the housing including the sidewall for which is preferably made from an easily mouldable but impervious plastics material, such as high density polyethylene. The cartridge inlet and outlet can be moulded or adapted so as to fit into the feed line from the storage tank. The cartridge may be cylindrical. In practice, the size of cartridge or other system used is broadly matched, taking into account the exchange capacity of the resin present in the cartridge and the volume of peroxide to be treated and its initial impurity content, which has been tested beforehand. If an excessive volume of peroxide is treated, the resultant peroxide solution would contain an undesirably high residual concentration of one or more metals, and especially alkaline earth metals rather than alkali metals. To avoid such an occurrence, the cartridge, in practice, can be changed at appropriate intervals based on the volume of solution that has been passed through it. The intervals can be assessed by very small scale testing on a sample or on the basis of past experience. To minimise the risk of a spent cartridge being re-employed, it could if desired include a small visible indicator strip that would change colour when contacted with hydrogen peroxide, especially on the inlet side.

Having described the invention in general terms, specific embodiments thereof will now be described in greater detail by way of non-limiting example.

EXAMPLE 1

Purification

In this Example, a batch of aqueous 35% w/w hydrogen peroxide solution which had previously been purified by a treatment with a stannic oxide dispersion according to Example 1 of the SOPP Application was fed in one liter amounts through a PTFE membrane which had been impregnated with an ion exchange resin, which is available from Bio-Rad Laboratories under the trade mark Bio-Rex, grade AG 50W-X8. The membrane had a diameter of 47 mm and a nominal pore size of 0.45 microns. The resin was a styrene/divinylbenzene matrix carrying sulphonic acid substituents and having an ionic capacity of 2.63 meq per membrane. The membrane was prewashed with methanol.

The hydrogen peroxide solution before treatment contained 37 ppb sodium, 40 ppb calcium, aluminium and very low residual levels of transition metal ions, specifically iron and copper representing less than 10 w/w of the total ion content. Each liter of treated solution was separately analysed for metals contents using a Atomic Absorption Spectrometry. In the first three liters, the residual sodium and calcium levels were below the detection limit of the analyser. In the fourth and fifth liters, the sodium level remained below the detection limit but the calcium level was now detectable at respectably 23 and 35 ppb. This indicates that particularly in treatment of the fifth liter, the capacity of the resin to take metal ions, and particularly calcium ions was becoming exhausted.

The membrane was relaced by a fresh identical membrane and a further 6 liters of the hydrogen peroxide solution were treated in liter batches. The same trend in treatment effectiveness was observed in this series as in the first series. In the sixth liter, the residual sodium content was 12 ppb and the residual calcium level 60 ppb, the latter figure indicating not only that the resin had been exhausted but also that some of the calcium previously taken up by the resin was being displaced by the other metals such as sodium in the sixth liter of solution. The once treated solution was collected and passed through a further membrane which had been used for treating two liters previously, and of which one liter appeared to have been contaminated by plaster dust. Despite its unpromising history, the membrane was still able to lower the sodium level to below detection and the calcium level to 23 ppb.

EXAMPLE 2

In this Example the aqueous hydrogen peroxide starting material comprised a mixture of 1 liter samples that had been obtained in Example 1. The starting analysis indicated that the sodium, calcium and aluminium levels were respectively 10, 50 and 11 ppb. The mixture was then passed through a further fresh Bio-Rex membrane and the residual metal contents had been reduced very substantially. For example, in the third liter, the sodium and calcium levels were below detection limits and the aluminium level was only 3 ppb.

We claim:

1. A process for the purification of an impure aqueous hydrogen peroxide solution containing a substantial excess of non-transition metal cations relative to transition metal cations, said process comprising passing said impure solution through a membrane containing a particulate cation exchange resin in essentially hydrogen form.

2. A process according to claim 1 wherein said transition metals comprise in total no more than 20% w/w of the total weight of cations in the solution.

3. A process according to claim 1 or claim 2 wherein the total concentration of transition metal cations is no more than 20 ppb and the total concentration of non-transition metal cations is from 50 to 150 ppb.

4. A process according to claim 1 wherein said cation exchange resin is embedded within the membrane.

5. A process according to claim 1 or claim 4 wherein said membrane comprises a material that is chemically inert to hydrogen peroxide and has a nominal pore size of less than 1 micron diameter.

6. A process according to claim 5 wherein said membrane comprises polytetrafluoroethylene and has a nominal pore size in the range of 0.1 to 0.5 microns.

7. A process according to claim 1 wherein said cation exchange resin comprises a strong acid.

8. A process according to claim 7 wherein said strong acid ion exchange resin comprises a polystyrenedivinylbenzene resin carrying sulphonic acid substituents.

9. A process according to claim 1 wherein the passing step comprises passing said impure solution through a series of resin-containing membranes.

10. A process according to claim 1 wherein the impure aqueous hydrogen peroxide solution which contains a low proportion of transition metal cations has been obtained by treating a hydrogen peroxide solution containing a substantially higher content of transition metal cations with a dispersion of stannic oxide.

11. A process according to claim 10, wherein said stannic oxide dispersion in the pretreatment step was obtained by subjecting a particulate suspension of stannic oxide in an aqueous fluid to high shearing forces.

12. A process according to claim 10 or claim 11 wherein stannic oxide particles are present in suspension in the hydrogen peroxide solution and wherein the stannic oxide particles are filtered out during the passage of the impure hydrogen peroxide solution through the membrane containing the cation exchange resin.

13. A process according to claim 1 wherein a polystyrenedivinylbenzene resin carrying sulphonic acid substituents is embedded within the membrane, said membrane comprising polytetrafluoroethylene and having a nominal pore size in the range of from 0.1 to 0.5 microns.

14. A process according to claim 1 or claim 13 wherein said membrane is fitted transversely across and snugly within the side walls of a cartridge.

15. A process according to claim 14 wherein the cartridge side wall is made from an impervious plastics material.

16. A process according to claim 15 wherein said impervious plastics material comprises high density polyethylene.

17. A process according to claim 14 wherein said cartridge has an inlet which is adapted to fit in or to receive an outlet line from a tank for said impure hydrogen peroxide solution.

18. A process according to claim 14 wherein the cartridge side wall is cylindrical.

19. A process according to claim 14 wherein the cartridge side wall defines with two membranes a space in which particulate cation exchange resin is housed.

* * * * *